United States Patent Office 2,699,481
Patented Jan. 11, 1955

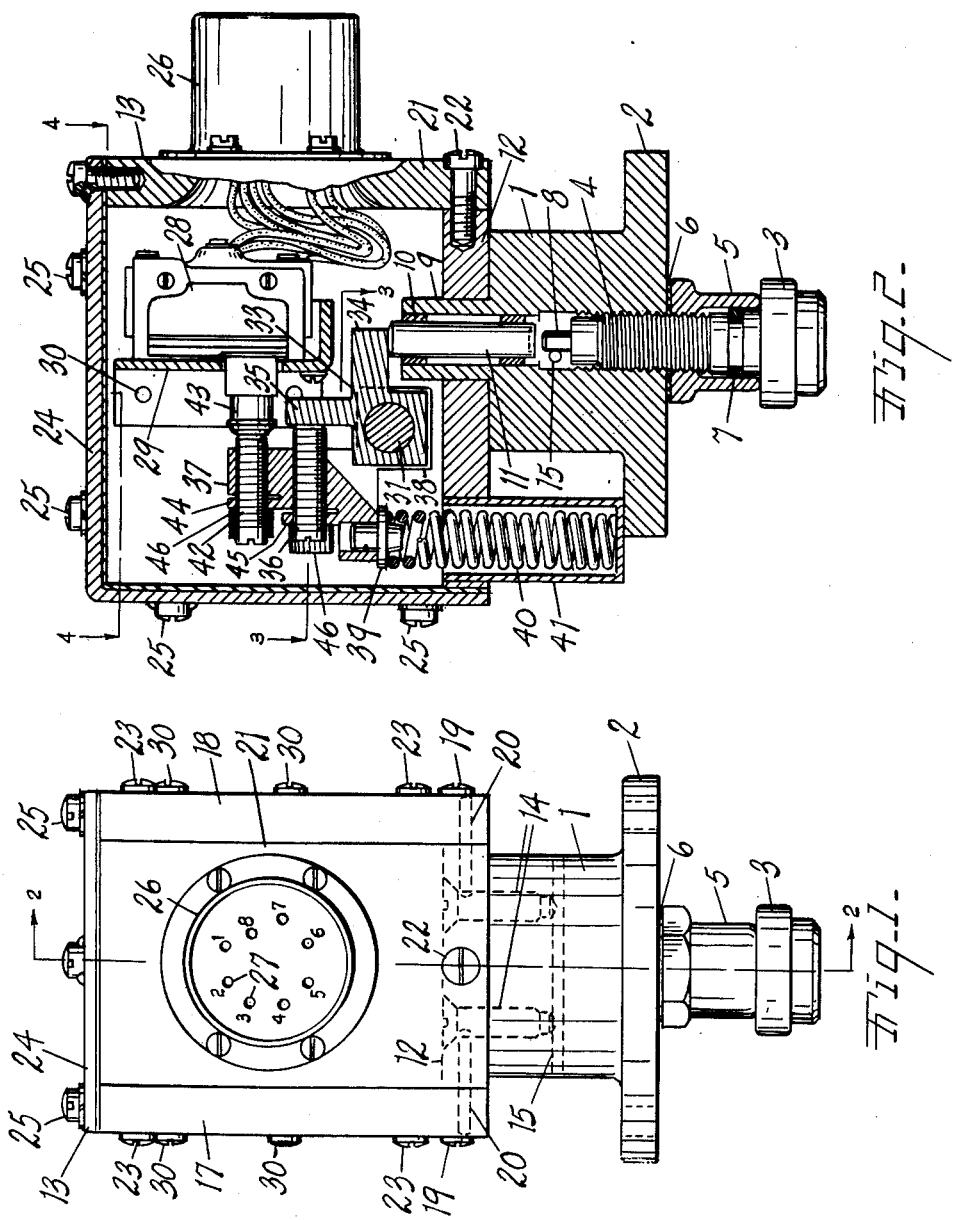

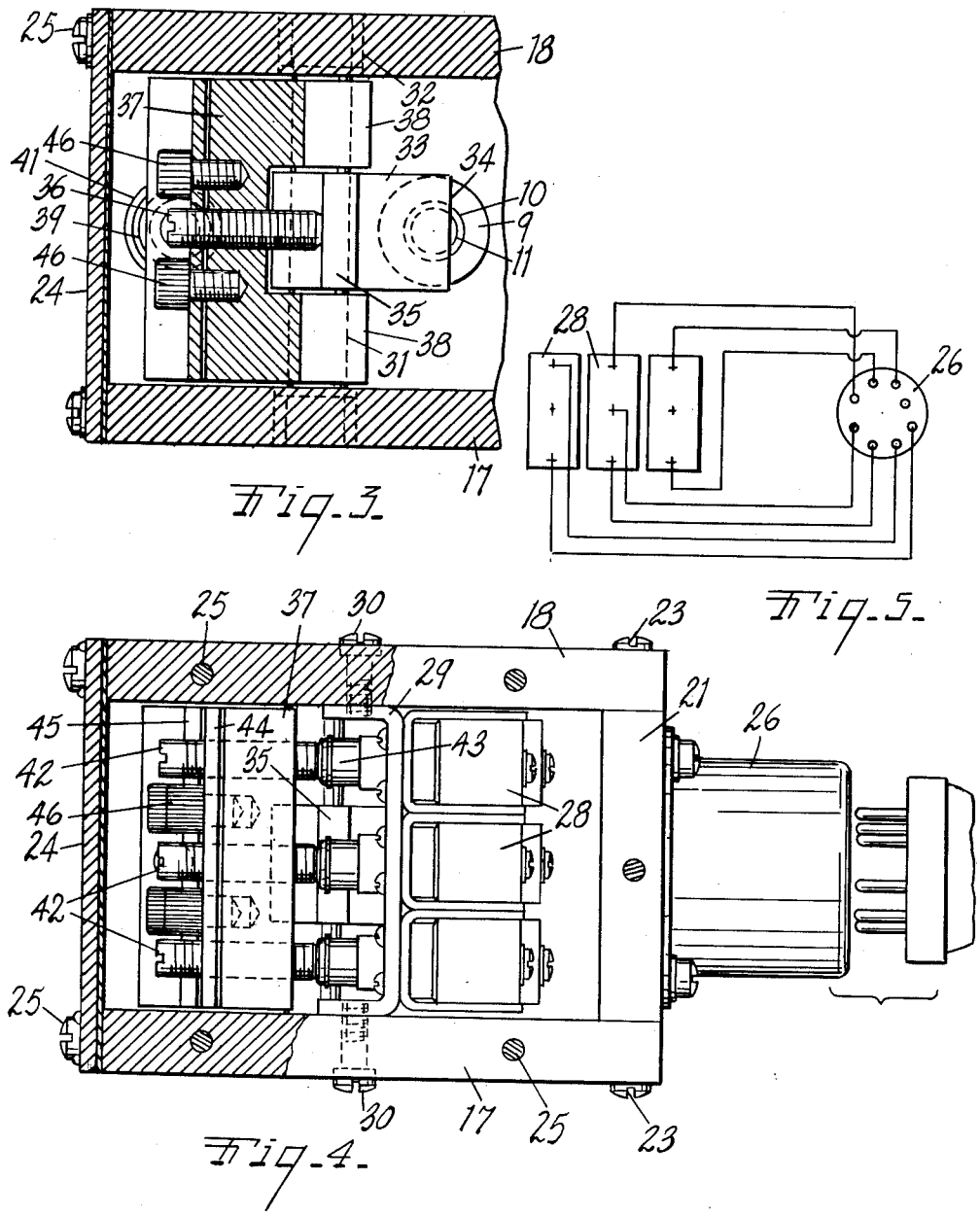

2,699,481

TEMPERATURE CONTROL APPARATUS FOR INTERNAL-COMBUSTION ENGINES OF LOCOMOTIVES AND THE LIKE

David R. Ferris, Cadillac, Mich., assignor to Kysor Heater Company, Cadillac, Mich.

Application July 3, 1952, Serial No. 297,026

5 Claims. (Cl. 200—140)

This invention relates to improvement in a multiple contact thermally actuated switch.

The principal objects of this invention are:

First, to provide a thermally actuated switch that may be arranged to close a plurality of contacts in predetermined adjustable sequence in the thermal cycle of the switch.

Second, to provide a thermally actuated switch that can be adjusted to operate in a desired thermal range and further adjusted to actuate several contacts at different periods or positions in the thermal range.

Third, to provide a thermally actuated switch that is adapted to actuate a plurality of contacts in different sequence according to the rise or fall of the temperature to which the switch is responsive.

Fourth, to provide a switch of the type described which is relatively inexpensive but which can be accurately set and adjusted to actuate a plurality of contacts in the desired time or temperature relationship.

Other objects and advantages of the invention will be apparent from a consideration of the following description and claims. The drawings of which there are two sheets illustrate a highly practical form of the invention.

Fig. 1 is a front elevational view of the switch.

Fig. 2 is a vertical longitudinal cross sectional view through the switch taken along the plane of the line 2—2 in Fig. 1.

Fig. 3 is an enlarged fragmentary horizontal cross sectional view through a portion of the switch taken along the plane of the line 3—3 in Fig. 2.

Fig. 4 is a fragmentary plan view partially in section of the switch with the cover removed.

Fig. 5 is a schematic wiring diagram illustrating one method of connecting the several contacts of the switch assembly.

This invention is particularly related to a thermally responsive switch that is adapted to be mounted in the cooling system of a large internal combustion engine such as is found in a railway locomotive. The switch is responsive to the temperature in the cooling system and can be made to successively actuate the radiator shutters and cooling fan of the locomotive as the temperature of the engine requires more or less cooling action.

The switch includes a cylindrical base 1 having a bottom flange 2 that is adapted to be bolted to the outer wall of a conduit through which fluid is flowing and to the temperature of which the switch is to be responsive. A thermally responsive element 3 has a threaded neck 4 that is received in the bottom of the base 2 with the thermal element projecting from the flange 2. A spacing collar 5 spaces the thermal element a sufficient distance from the flange to project into the conduit. Seals are provided at 6 and 7 to prevent liquid from the conduit working into the base 1 and the body of the switch. A thermally responsive element 3 includes a plunger 8 that is projected upwardly from the body of the thermal element upon increase in temperature of the thermal element. The element 3 is a commercially available article sold under the trade name Vernatherm and the body of the element encloses a mass of thermally expansible material in plastic condition that bears against the plunger 8.

The upper end of the base 1 is provided with an upstanding nipple 9 that is vertically bored coaxially with the plunger 8. Bearings or bushings 10 slidably support a push rod 11 within the nipple 9 and projecting thereabove. The nipple is received in a circular hole in a bottom plate 12 of the switch case indicated generally at 13. The bottom plate 12 is fixedly secured to the base 1 by screws 14 (see Fig. 1) and a transverse bore 15 in the base permits any liquid which may leak along the thermal conduit into the base to escape.

The remainder of the case 13 consists of side plates 17 and 18 which are secured to the side edges of the bottom plate 12 by screws 19 and dowels 20. A front plate 21 is secured to the front edge of the bottom plate 12 by screws 22. The forward edges of the side plates 17 and 18 are secured to the sides of the front plate 21 by screws 23. The top and back of the case are formed by a removable cover 24 secured in place by the screws 25. The front plate 21 carries a multiple socket electrical jack 26 having eight prong receiving sockets 27 to which the wires of the several switch elements are connected as will be described.

The operating structure within the case 13 includes a plurality of minimum movement switch elements 28 which are mounted on a switch support beam 29 extending transversely across the case above the push rod 11. Three switch elements are illustrated in the example but more or less could be provided as desired. The switch support beam 29 is secured between the side plates 17 and 18 by the screws 30. Also extending between the side plates 17 and 18 is a rock shaft 31 which has its ends rotatably supported in bearings 32 mounted in the side plates. The rock shaft 31 is disposed rearwardly from the push rod 11.

Rockably mounted on the center of the rock shaft 31 is an intermediate rocker 33 having a forwardly extending arm 34 that overlies the end of the push rod 11. An upwardly projecting arm 35 on the intermediate rocker is adapted to be engaged by the adjustable screw 36 carried by a switch beam 37 as will be described.

The switch beam 37 extends transversely across the interior of the case and is provided with forwardly extending ears or flanges 38 that are rotatably mounted on the rock shaft 31 on opposite sides of the intermediate rocker 33. The previously mentioned adjusting screw 36 which constitutes the range adjustment of the thermal switch is carried by the mid-portion of the switch beam 37 to adjustably engage the upstanding arm 35 of the intermediate rocker. The rear portion of the switch beam 37 is provided with a centering abutment 39 for a coil spring 40 that extends downwardly through the bottom plate 12 in a housing 41. The spring 40 thus constantly biases the switch beam 37 and the range adjustment screw 36 forwardly in a clock-wise motion or direction about the rock shaft 31. The forwardly projecting arm 34 of the intermediate rocker is thus biased downwardly to bias the push rod 11 against the plunger 8 of the thermal element 3.

Mounted on the switch beam 37 above the range adjustment screw 36 are three individual switch adjusting screws 42 associated one with each of the switch elements 28. The screws 42 project adjustably forwardly from the switch beam 37 to engage the actuating tappets 43 of the switch elements 28. In order to make the switch assembly accurately adjustable and secure in its adjustment the switch beam 37 is provided with a lock flange 44 through which the screws 42 extend and a further lock flange 45 through which the range adjustment screw 36 extends. Knurl headed screws 46 are provided for deflecting the flanges 44 and 45 into locking engagement with the screws 42 and 36.

The switch elements 28 may be of two contact open and close type or they may include a three contact arrangement in which a common center is alternately closed upon opposed fixed contacts by movement of the actuating tappet 43. The schematic diagram in Fig. 5 illustrates one switch element 28 adapted for three contact operation while the other two switch elements are adapted for simple open and close motion. The connection of the switch elements and their contacts can, of course, be varied as desired depending upon the circuits which the switch assembly as a whole is to control.

From the foregoing description is should be apparent that the range adjustment screw 36 can be adjusted to cause movement of the intermediate rocker 33 and the switch beam 37 at a predetermined temperature in response to movement of the actuating plunger 8 of the thermal element. Note that initial movement of the switch beam 37 need not immediately actuate any one or all of the tappets 43 of the switch elements 28 as the several switch actuating screws 42 may be selectively adjusted to actuate first one and then the others of the switch elements. Reverse action of the switch beam 37 in response to cooling of the thermal element 3 will result in actuation of the switch elements 28 in reverse direction and in reverse sequence. As has been pointed out the switch construction is simple and relatively inexpensive but is at the same time held in adjusted position so as to accurately control the several switch elements in the desired sequence and in the desired temperature range. The example of the switch assembly illustrated is intended as a disclosure of one possible arrangement of the several elements of the switch assembly and not as a limitation of the invention. Quite obviously the various changes and modifications of the switch assembly may be made without departing from the spirit of the invention as defined in the following claims.

Having thus described my invention, what I claim as new and desire to secure by Letters Patent, is:

1. A multiple circuit, thermally responsive, switch apparatus comprising, a base adapted to be secured to a fluid conduit, a thermally responsive control element projecting from the inner side of said base to be located within said conduit and having an actuating element extensible toward the outer side of said base upon temperature increase of said control element, a plurality of minimum movement electrical switches fixedly carried by said base and each provided with an individual actuating element, a switch beam mounted on said base and having a first flange positioned in opposited relationship to said individual actuating elements, individually adjustable screw means providing thrust engagement between said first flange and said individual actuating elements at selective points in the range of movement of said switch beam, a spring compressed between said base and said beam to bias said switch beam to switch actuating position, an intermediate actuating member pivotally mounted on said base and having one face opposed to said first flange, a range adjusting screw selectively adjustable to provide thrust engagement between said first flange and said one face at predetermined portions of the range of movement of said intermediate actuating member and in opposition to said spring, a second face on said intermediate member overlying said actuating element of said thermal control element, and means for imparting the motion of said first actuating element to said intermediate member.

2. A multiple circuit, thermally responsive, switch apparatus comprising, a base adapted to be secured to a fluid conduit, a thermally responsive control element projecting from the inner side of said base to be located within said conduit and having an actuating element extensible toward the outer side of said base upon temperature increase of said control element, a plurality of minimum movement electrical switches fixedly carried by said base and each provided with an individual actuating element, a switch beam pivotally mounted on said base and having a radially extending portion positioned in opposed relationship to said individual actuating elements, individually adjustable screw means providing thrust engagement between said radially extending portion and said individual actuating elements at selective points in the range of movement of said switch beam, an intermediate actuating member mounted on said base between said first actuating element and said beam and movable to transmit thrust therebetween, and a range adjusting screw adjustably positioned in said thrust connection between said beam and said first actuating element to transmit thrust at predetermined portions of the range of movement of said first actuating element.

3. A multiple circuit, thermally responsive, switch apparatus comprising, a base adapted to be secured to a fluid conduit, a thermally responsive control element projecting from the inner side of said base to be located within said conduit and having an actuating element extensible toward the outer side of said base upon temperature increase of said control element, a plurality of minimum movement electrical switches fixedly carried by said base and each provided with an individual actuating element, a switch beam movably mounted on said base and having a portion positioned in opposed relationship to said individual actuating elements to transmit thrust thereto at selective points in the range of movement of said switch beam, an intermediate actuating member mounted on said base between said first actuating element and said beam and movable to transmit thrust therebetween, and a range adjusting screw adjustably positioned in the thrust connection between the switch beam and said first actuating element to transmit thrust at predetermined portions of the range of movement of said first actuating element.

4. A multiple circuit thermal switching device comprising, a base having a projecting nipple on one end and a mounting flange on the other end adapted to be secured to a fluid conduit, a thermally responsive element threadingly secured to the bottom of said base and projecting therefrom, a plunger extensible from said thermal element toward said nipple, a bottom plate of a case positioned over said nipple and secured to said base, a push rod slidable in said nipple between said plunger and the interior of said case, side walls for said case secured to the sides of said bottom plate, a fixed beam secured to said side walls and over said push rod, a plurality of minimum movement electrical switches fixedly mounted on said fixed beam and having actuating tappets projecting horizontally therefrom, a rock shaft journaled in and extending between said side walls, a switch beam rockable about the axis of said shaft and having a flange opposed to the tappets of said switches, individual adjusting screw means carried by said flange and adjustably engagable between said flange and said tappets, a spring positioned between said base and said rockable switch beam to bias the switch beam toward said tappets, an intermediate member rockable relative to said bottom plate about the axis of said shaft and having a portion opposed to the flange of said rockable switch beam, an ear on said intermediate member overlying said push rod for movement thereby, a range adjusting screw means threadingly engaged with said flange and extending between said rockable switch beam and said intermediate member to transmit motion therebetween, and means for connecting said switches in different electrical circuits.

5. A multiple circuit thermal switching device comprising, a base having a projecting nipple on one end and a mounting flange on the other end adapted to be secured to a fluid conduit, a thermally responsive element secured to the bottom of said base and projecting therefrom, a plunger extensible from said thermal element toward said nipple, a bottom plate of a case positioned over said nipple and secured to said base, a push rod slidable in said nipple between said plunger and the interior of said case, side walls for said case secured to the sides of said bottom plate, a fixed beam secured to said side walls, a plurality of minimum movement electrical switches fixedly mounted on said fixed beam and having actuating tappets projecting therefrom, a rock shaft extending between said side walls, a switch beam rockable about the axis of said shaft and having a flange opposed to the tappets of said switches, individual adjusting screw means adjustably engagable between said flange and said tappets, a spring positioned to bias the switch beam toward said tappets, an intermediate member rockable relative to said bottom plate and having a portion opposed to said rockable switch beam, said intermediate member overlying said push rod for movement thereby, a range adjusting screw means extending between said rockable switch beam and said intermediate member to transmit motion therebetween, and means for connecting said switches in different electrical circuits.

References Cited in the file of this patent

UNITED STATES PATENTS

| 2,092,085 | Riley | Sept. 7, 1937 |
| 2,296,063 | Shaw | Sept. 15, 1942 |
| 2,338,365 | Thorp et al. | Jan. 4, 1944 |
| 2,355,975 | Henrici | Aug. 15, 1944 |
| 2,379,305 | Kaminky | June 26, 1945 |
| 2,496,229 | Parkhurst | Jan. 31, 1950 |
| 2,562,385 | Marcellus | July 31, 1951 |